3,471,501
PICOLINE DERIVATIVES
Seiji Miyano, Fukuoka, and Yoshitoshi Kase, Kumamoto, Japan; said Miyano assignor to Takeda Chemical Industries, Ltd., Osaka, Japan
No Drawing. Filed Feb. 16, 1967, Ser. No. 616,456
Claims priority, application Japan, Feb. 16, 1966, 41/9,591
Int. Cl. C07d *31/42, 57/00;* A61k *27/00*
U.S. Cl. 260—293                                    14 Claims

ABSTRACT OF THE DISCLOSURE

Compounds of the formula

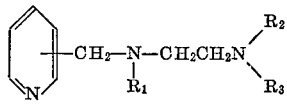

($R_1$=pyridyl, lower alkoxyphenyl, halophenyl; $R_2$= lower alkyl; $R_3$=lower alkyl;

piperidino, pyrrolidino) are excellent non-narcotic antitussive agents.

---

This invention relates to novel compounds having remarkable antitussive action. More concretely stated, the invention is concerned with a series of picoline derivatives having excellent antitussive action in comparison with hitherto-known antitussives and having less side effects than the latter.

Of the relatively large number of hitherto-employed antitussive compositions for the relief of tussis coughing, those containing codeine have generally been regarded as most effective. However, codeine is bound up with the defect that it is narcotic and tends to cause habituation on administration, i.e. has a so-called physical dependence capacity. Moreover, codeine has a rather high acute toxicity.

It has thus been a desideratum in this art to provide an effective non-narcotic antitussive agent.

According to the present invention, this desideratum is fulfilled by a series of novel picoline compounds (cf. Formula I, infra) which have an excellent antitussive action and show no narcotic characteristics, i.e. are free of physical dependence capacity and are not habit-forming.

The object of the present invention is to provide novel picoline derivatives useful as non-narcotic but effective antitussive agents.

The objective novel picoline derivatives of the present invention are represented by the following formula:

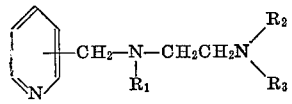

wherein $R_1$ is pyridyl, phenyl, alkoxyphenyl with 7 to 10 carbon atoms such as p-, o- or m-methoxyphenyl, p-, o- or m-ethoxyphenyl, p-, o- or m-propoxyphenyl, p-, o- or m-butoxyphenyl and p-, o- or m-isopropoxyphenyl, etc., or halophenyl such as p-, o- or m-chlorophenyl, p-, o- or m-bromophenyl and p-, o- or m-iodophenyl, etc., and $R_2$ and $R_3$ stand for the same or different lower alkyl groups with 1 to 4 carbon atoms such as methyl, ethyl, propyl, isopropyl, butyl, t-butyl, etc., and $R_2$ and $R_3$ together with the adjacent nitrogen atom form the piperidino or the pyrrolidino group.

These new compounds are not only as effective as codeine in antitussive action, but also show substantially no narcotic characteristics, that is to say, are free of physical dependence capacity (habituation) on administration to the human body.

Moreover, the new compounds show lower acute toxicity than codeine.

The new compounds of Formula I are prepared according to the following reaction scheme:

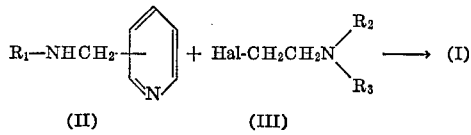

wherein $R_1$, $R_2$ and $R_3$ have the same meanings as above, and Hal stands for halogen, such as chlorine, bromine, iodine, etc.

Compound (II) can be prepared by reacting pyridyl methanol

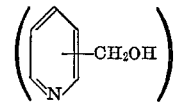

with the corresponding amine ($R_1$–$NH_2$) in the presence of pyridine aldehyde; see "Chemical and Pharmaceutical Bulletin," 13(9), 1135 (1965).

The reaction between compounds (II) and (III) is preferably carried out under reflux in an organic solvent such as benzene, toluene, xylene, etc. The reaction is accelerated by the presence of a condensing agent such as sodamide ($NaNH_2$) and thus it is desirable to employ the organic solvent in anhydrous state.

Thus-produced compounds of Formula I are exemplified as follows:

N,N-dimethyl-N'-phenyl-N'-(2-pyridylmethyl) ethylenediamine;
N,N-diethyl-N'-phenyl-N'-(2-pyridylmethyl) ethylenediamine;
N-(2-piperidinoethyl)-N-(2-pyridylmethyl)aniline;
N-(2-pyrrolidinoethyl)-N-(2-pyridylmethyl)aniline;
N,N-dimethyl-N'-(p-methoxyphenyl)-N'-(2-pyridylmethyl)ethylenediamine;
N,N-diethyl-N'-(p-methoxyphenyl)-N'-(2-pyridylmethyl)ethylenediamine;
N-(2-piperidinoethyl)-N-(2-pyridylmethyl)-p-anisidine;
N-(2-pyrrolidinoethyl)-N-(2-pyridylmethyl)-p-anisidine;
N,N-dimethyl-N'-(2-pyridyl)-N'-(2-pyridylmethyl) ethylenediamine;
N,N-diethyl-N'-(2-pyridyl)-N'-(2-pyridylmethyl) ethylenediamine;
N-(2-piperidinoethyl)-N-(2-pyridylmethyl)-2-aminopyridine;
N-(2-pyrrolidinoethyl)-N-(2-pyridylmethyl)-2-aminopyridine;
N,N-dimethyl-N'-phenyl-N'-(2-pyridylmethyl)-ethylenediamine;
N,N-diethyl-N'-phenyl-N'-(4-pyridylmethyl) ethylenediamine;
N-(2-piperidinoethyl)-N-(4-pyridylmethyl)aniline; and
N-(2-piperidinoethyl)-N-(2-pyridylmethyl)-p-chloroaniline.

These picoline derivatives form pharmaceutically acceptable acid addition salts with inorganic acids such as hydrochloric acid, sulfuric acid, etc., and with organic acids such as citric acid, tartaric acid, etc.

When the compounds (as such or as their aforesaid salts) are used as antitussives, a daily dose of about 10 to about 500 milligrams, generally about 50 to about 100 milligrams for adult, is advisable.

The compounds of the present invention can be administered solely, or in combination with a pharmaceutically acceptable carrier, or can be administered together with other antitussives, with or without any other pharmaceutically acceptable table carrier, the compounds being in any case administered as powder, tablets, solutions, emulsions, etc. for oral administration, or as injections, etc. for non-oral administration. The choice of carrier is determined by the preferred route of administration, the solubility of the compounds and standard pharmaceutical practice.

The following examples are solely for the purpose of illustration and are not to be construed as limitations of this invention, many variations being possible without departing from the spirit or scope of this invention. The relationship between parts by volume and parts by weight is the same as that between grams and milliliters.

Example 1

To a simultaneously stirred and refluxed suspension of 3 parts by weight of sodamide in 40 parts by volume of anhydrous toluene there is added dropwise a solution of 11 parts by weight of N-(2-pyridylmethyl)-aniline in 20 parts by volume of anhydrous toluene. After the addition is complete, the mixture is further refluxed for two hours under constant stirring. To the resulting mixture there is added dropwise a solution of 4 parts by weight of β-dimethylaminoethyl chloride in 10 parts by volume of anhydrous toluene and the whole mixture is stirred and refluxed for another two hours. After cooling, water is added carefully to decompose unreacted sodamide, the separated toluene layer is dried over anhydrous sodium sulfate and the solvent removed under reduced pressure. The residual oil is subjected to distillation under reduced pressure, the fraction boiling in the range of 155–189° C./4 mm. Hg being collected. Purification of this fraction by re-distillation under reduced pressure gives 4.7 parts by weight of N,N-dimethyl-N'-phenyl-N'-(2-pyridylmethyl)ethylenediamine which boils at 186–189° C./4 mm. Hg. Yield 50.0%.

Elementary analysis. — $C_{16}H_{21}N_3$. Calculated: C, 75.25%; H, 8.29%; N, 16.46%. Found: C, 75.63%; H, 8.11%; N, 16.80%.

To 2.5 parts by weight of thus-prepared compound dissolved in anhydrous ethyl ether, there are added 8 parts by volume of ethanol containing 5% of hydrogen chloride while cooling with ice, whereby the hydrochloride precipitates as dense crystals, After being kept in the refrigerator for several days, the crystals are recrystallized from a mixture of ether and ethanol to give 2.1 parts by weight of N,N-dimethyl-N'-phenyl-(2-pyridylmethyl)-ethylenediamine hydrochloride as colorless needles which melt at 263–265° C. (decomp.)

Example 2

To a simultaneously stirred and refluxed suspension of 4 parts by weight of sodamide in 40 parts by volume of anhydrous toluene, there is added dropwise a solution of 14 parts by weight of N-(2-pyridylmethyl)aniline in 20 parts by volume of anhydrous toluene. After the addition is complete, the mixture is refluxed for two hours under constant stirring. To the resulting mixture, there is added dropwise a solution of 11 parts by weight of β-diethyl-aminoethyl chloride in 10 parts by volume of anhydrous toluene and the whole mixture is stirred and refluxed for another two hours. After cooling, water is added carefully to decompose unreacted sodamide, the separated toluene layer is dried over anhydrous sodium sulfate and the solvent removed under reduced pressure. The residual oil is subjected to distillation under reduced pressure, the fraction boiling in the range of 170–178° C./4 mm. Hg being collected. Purification of the said fraction by re-distillation under reduced pressure gives 12.7 parts by weight of N,N - diethyl - N'-phenyl-N'-(2-pyridylmethyl)-ethylenediamine which boils at 173–176° C./3 mm. Hg. Yield 57.5%.

Elementary analysis .— $C_{18}H_{25}N_3$. Calculated: C, 76.28%; H, 8.89%; N, 14.83%. Found: C, 76.72%; H, 8.59%; N, 14.97%.

To 5.6 parts by weight of thus-prepared compound dissolved in anhydrous ether, there are added 16 parts by volume of anhydrous ethanol containing 5% of hydrogen chloride while cooling with ice, whereby oily substance separates. Evaporation of the solvent under reduced pressure gives crystalline substances, which are then recrystallized from a mixture of ether and ethanol to give 4.8 parts by weight of N,N-diethyl-N'-phenyl-N'-(2-pyridylmethyl)ethylenediamine hydrochloride as pale-yellow needles, which melt at 173–174° C. (decomp.)

Example 3

To a simultaneously stirred and refluxed suspension of 5.6 parts by weight of sodamide in 60 parts by volume of anhydrous toluene, there is added dropwise a solution of 18.4 parts by weight of N-(2-pyridylmethyl)aniline in 20 parts by volume of anhydrous toluene. After the addition is complete, the mixture is refluxed for two hours under constant stirring. To the resulting mixture, there is added dropwise a solution of 14.9 parts by weight of 2-piperidinoethyl chloride in 20 parts by volume of anhydrous toluene and the whole mixture is stirred and refluxed for another two hours. After cooling, water is added carefully to decompose the unreacted sodamide, the separated toluene layer is dried over anhydrous sodium sulfate and the solvent removed under reduced pressure. The residual oil is subjected to distillation under reduced pressure, the fraction boiling in the range of 185–198° C./4 mm. Hg being collected. Purification of the said fraction by re-distillation under reduced pressure gives 22.5 parts by weight of N - (2 - piperidinoethyl)-N-(2-pyridylmethyl)-aniline which boils at 195–196° C./4 mm. Hg. Yield 76.3%.

Elementary analysis. — $C_{19}H_{25}N_3$. Calculated: C, 77.24%; H, 8.53%; N, 14.23%. Found: C, 77.43%; H, 8.88%; N, 14.15%.

To 3 parts by weight of thus-prepared compound dissolved in anhydrous ether there are added 8 parts by volume of anhydrous ethanol containing 5% of hydrogen chloride while cooling with ice, whereby the hydrochloride precipitates as dense crystals. After being kept in the refrigerator for several days, the crystals are recrystallized from a mixture of ether and ethanol to give 2.1 parts by weight of N-(2-piperidinoethyl)-N-(2-pyridylmethyl)aniline hydrochloride as colorless needles melting at 183–185° C. (decomp.)

Example 4

To a mixture of 3.8 parts by weight of sodamide and 40 parts by volume of anhydrous toluene, there is dropwise added 12.4 parts by weight of N-(2-pyridylmethyl) aniline dissolved in 20 parts by volume of anhydrous toluene under reflux with agitation, followed by further agitation under reflux for 2 hours to allow a reaction to take place. To the resulting reaction mixture, there is dropwise added 10 parts by weight of 2-pyrrolidinoethyl chloride dissolved in 10 parts by volume of anhydrous toluene, and the whole mixture is stirred under reflux for two hours.

After the reaction mixture has cooled by standing at room temperature (about 20 to 35° C.), water is added thereto, whereby unreacted sodamide is decomposed. Toluene layer separated from the thus-treated mixture is dried with anhydrous sodium sulfate and then subjected to distillation under reduced pressure to collect a fraction having a boiling range of 185–200° C./5 mm. Hg. Purification of this fraction by vacuum distillation gives 10.6 parts by weight of N-(2-pyrrolidinoethyl)-N-(2-pyridylmethyl)aniline which boils at 193–196° C./5 mm. Hg. Yield 49.5%.

Elementary analysis. — $C_{18}H_{23}N_3$. Calculated: C, 76.83%; H, 8.24%; N, 14.93%. Found: C, 76.53%; H, 8.31%; N, 15.08%.

To 2.8 parts by weight of thus-prepared compound dissolved in anhydrous ethyl ether there are added 8 parts by volume of ethanol containing 5% of hydrogen chloride while cooling with ice, whereby oily substance precipitates.

Removal of the solvent from the mixture by distillation under reduced pressure gives a crystalline compound, which is then recrystallized from a mixture of ether and ethanol to give 1.7 parts by weight of N-(2-pyrrolidinoethyl)-N-(2-pyridylmethyl)aniline hydrochloride as colorless chrysanthemum-like crystals, which melt at 196–197° C. (decomp.)

Example 5

To a simultaneously stirred and refluxed suspension of 4 parts by weight of sodamide in 40 parts by volume of anhydrous toluene, there is added dropwise a solution of 21.5 parts by weight of N-(2-pyridylmethyl)-p-anisidine in 20 parts by volume of anhydrous toluene. After the addition is complete, the mixture is refluxed for two hours under constant stirring. To the resulting mixture, there is added dropwise a solution of 14.7 parts by weight of 2-piperidinoethyl chloride in 10 parts by volume of anhydrous toluene, and the whole mixture is stirred and refluxed for another two hours. After cooling, water is added carefully to decompose unreacted sodamide, the separated toluene layer is dried over anhydrous sodium sulfate and the solvent removed under reduced pressure. The residual oil is subjected to distillation under reduced pressure, the fraction boiling in the range of 178–195° C./4.5 mm. Hg being collected. Purification of the said fraction by re-distillation under reduced pressure gives 11.2 parts by weight of N-(2-piperidinoethyl)-N-(2-pyridylmethyl)p-anisidine which boils at 187–191° C./4.5 mm. Hg. Yield 34.5%.

Elementary analysis. — $C_{20}H_{27}N_3O$. Calculated: C, 73.81%; H, 8.36%; N, 12.91%. Found: C, 73.55%; H, 8.62%; N, 13.11%.

Its hydrochloride is formed as colorless prisms melting at 178–179° C. (decomp.) according to the procedure described in the preceding examples.

Example 6

2-pyrrolidinoethyl chloride in place of 2-piperidinoethyl-chloride as one of the starting materials in Example 5 is allowed to react with N-(2-pyridylmethyl)-β-anisidine to give N-(2-pyrrolidinoethyl)-N-(2-pyridylmethyl)-p-anisidine which boils at 200–203° C./4 mm. Hg. Yield 22.9%.

Elementary analysis. — $C_{19}H_{25}ON_3$. Calculated: C, 73.28%; H, 8.09%; N, 13.49%. Found: C, 73.48%; H, 7.75%; N, 13.80%.

Its hydrochloride is formed as colorless needles melting at 260–262° C. (decomp.) according to the procedure described in the preceding examples.

Example 7

To a mixture of 24 parts by weight of sodamide and 40 parts by volume of anhydrous toluene there is dropwise added 10.0 parts by weight of N-(2-pyridylmethyl)-2-aminopyridine dissolved in 20 parts by volume of anhydrous toluene under reflux with agitation, followed by further agitation under reflux for 2 hours to allow a reaction to take place.

To the resulting reaction mixture, there is dropwise added 5.9 parts by weight of β-dimethylaminoethyl chloride in 10 parts by volume of anhydrous toluene, and the whole mixture is stirred under reflux for 2 hours.

After the reaction mixture is cooled by standing at room temperature, water is added thereto, whereby unreacted sodamide is decomposed. Toluene layer separated from the thus-treated mixture is dried with anhydrous sodium sulfate and then subjected to distillation under reduced pressure, the fraction having a boiling range of 152–164° C./4 mm. Hg being collected. Purification of this fraction by re-distillation under reduced pressure gives 8.4 parts by weight of N,N-dimethyl-N'-(2-pyridyl) - N' - (2-pyridylmethyl)ethylenediamine which boils at 161–162° C./4 mm. Hg. Yield 60.1%.

Elementary analysis. — $C_{15}H_{20}N_4$. Calculated: C, 70.28%; H, 7.86%; N, 21.86%. Found: C, 69.89%; H, 7.54%; N, 21.61%.

Its hydrochloride is formed as colorless prisms melting at 227.5–229° C. (decomp.) according to the procedure described in the preceding examples.

Example 8

In place of β-dimethylaminoethyl chloride in the preceding example, β-diethylaminoethyl bromide, 2-piperidinoethyl chloride and 2-pyrrolidinoethyl bromide are employed to give N,N-diethyl-N'-(2-pyridyl)-N'-(2-pyridylmethyl)ethylenediamine (B.P. 185–185° C./4.5 mm. Hg, M.P. of hydrochloride: 222–224° C. (decomp.), M.P. of picrate: 206–207° C. (decomp.)); N-(2-piperidinoethyl) - N - (2 - pyridylmethyl) - 2 - aminopyridine (B.P.: 198–200° C./5 mm. Hg; M.P. of hydrochloride: 159–161° C. (decomp.); M.P. of picrate: 168.5–169.5° C. (decomp.)); and N-(2-pyrrolidinoethyl)-N-(2-pyridylmethyl)-2-aminopyridine (B.P.: 198–204° C./4 mm. Hg; M.P. of hydrochloride: 204–205° C. (decomp.); M.P. of picrate: 176–177° C. (decomp.)) in the yield of 61.5, 57.6 and 65.7% respectively.

Example 9

To a mixture of 2.8 parts by weight of sodamide and 50 parts by volume of anhydrous toluene, there is dropwise added 9.2 parts by weight of N-(4-pyridylmethyl)aniline dissolved in 20 parts by volume of anhydrous toluene under reflux with agitation, followed by further agitation under reflux for 2 hours.

To the resulting reaction mixture, there is added dropwise a solution of 7.4 parts by weight of 2-piperidinoethyl chloride in 10 parts by volume of anhydrous toluene and the whole mixture is stirred and refluxed for another 2 hours. After cooling, water is added carefully to decompose unreacted sodamide, the separated toluene layer is dried over anhydrous sodium sulfate and the solvent removed under reduced pressure, the fraction boiling in the range of 195–208° C./2 mm. Hg being collected. Purification of this fraction by re-distillation under reduced pressure gives 6.3 parts by weight of N-(2-piperidinoethyl) - N - (4 - pyridylmethyl)aniline which boils at 201–203° C./2 mm. Hg and melts at 83.5–84.5° C. Yield 42.6%.

Elementary analysis. — $C_{19}H_{25}N_3$. Calculated: C, 77.24%; H, 8.53%; N, 14.23%. Found: C, 77.61%; H, 8.57%; N: 14.55%.

Its hydrochloride is formed as colorless prisms melting at 204–205° C. (decomp.) according to the procedure described in the preceding examples.

Example 10

To a mixture of 4.5 parts by weight of sodamide and 60 parts by volume of anhydrous toluene, there is dropwise added 25 parts by weight of N-(2-pyridylmethyl)-p-chloroaniline dissolved in 35 parts by volume of anhydrous toluene under reflux with agitation, followed by further agitation under reflux for 2 hours to allow a reaction to take place.

To the resulting reaction mixture, there is dropwise added 16.7 parts by weight of 2-piperidinoethyl chloride in 20 parts by volume of anhydrous toluene, and the mixture stirred under reflux for 2 hours. After the reaction mixture has cooled by standing at room temperature, water is added thereto, whereby unreacted sodamide decomposed.

Toluene layer separated from the thus-treated mixture is dried with anhydorus sodium sulfate and then subjected to distillation under reduced pressure to yield a fraction having a boiling range of 185–198° C./4 mm. Hg. Purification of this fraction by re-distillation under reduced pressure gives 5.3 parts by weight of N-(2-piperidinoethyl) - N - (2 - pyridylmethyl) - p - chloroaniline which boils at 195–196° C./4 mm. Hg. Yield 14.1%.

Its hydrochloride is formed as colorless needles melting at 189–193° C. (decomp.) according to the procedure described in the preceding examples.

Having thus disclosed the invention, what is claimed is:

1. A member selected from the group consisting of compounds of the formula:

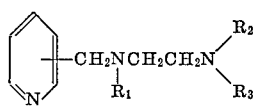

and pharmaceutically acceptable acid addition salts thereof, wherein $R_1$ stands for a member selected from the group consisting of pyridyl, phenyl, alkoxyphenyl of 7 to 10 carbon atoms, chlorophenyl, bromophenyl and iodophenyl, and $R_2$ and $R_3$ stand for the same or different alkyl of 1 to 4 carbon atoms, and wherein $R_2$ and $R_3$ together with the adjacent nitrogen atom are a member selected from the group consisting of piperidino and pyrrolidino.

2. A compound according to claim 1, wherein $R_1$ is selected from the group consisting of pyridyl, phenyl, methoxyphenyl and chlorophenyl, and

is selected from the group consisting of dimethylamino, diethylamino, piperidino and pyrrolidino.

3. A compound according to claim 1, namely the compound of the formula

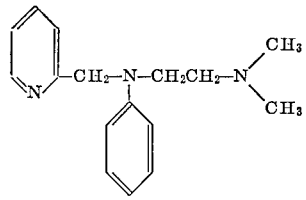

4. A compound according to claim 1, namely, the compound of the formula

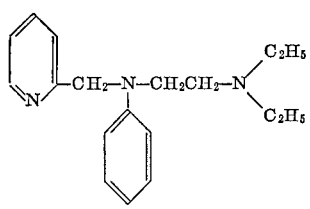

5. A compound accordng to claim 1, namely, the compound of the formula

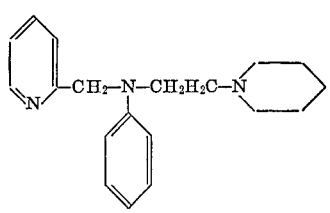

6. A compound according to claim 1, namely, the compound of the formula

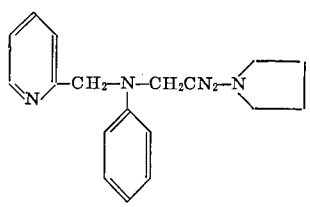

7. A compound according to claim 1, namely, the compound of the formula

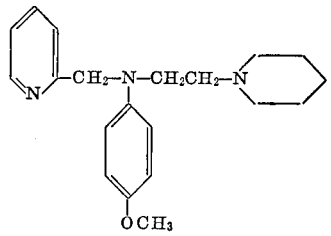

8. A compound according to claim 1, namely, the compound of the formula

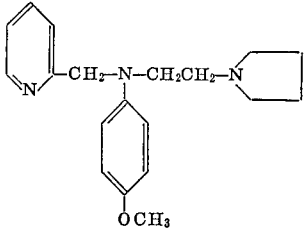

9. A compound according to claim 1, namely, the compound of the formula

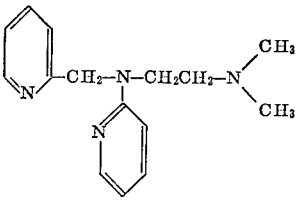

10. A compound according to claim 1, namely, the compound of the formula

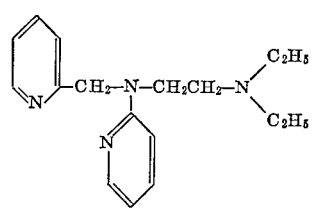

11. A compound according to claim 1, namely, the compound of the formula

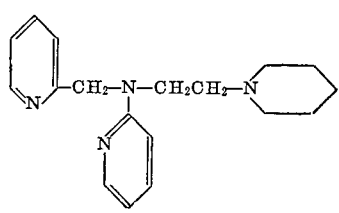

12. A compound according to claim 1, namely, the compound of the formula
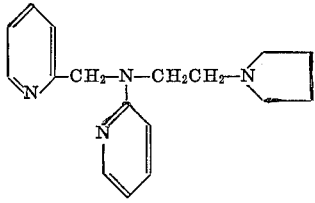
13. A compound according to claim 1, namely, the compound of the formula
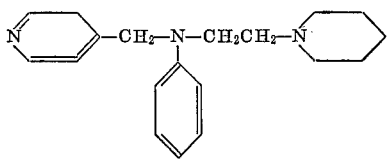
14. A compound according to claim 1, namely, the compound of the formula
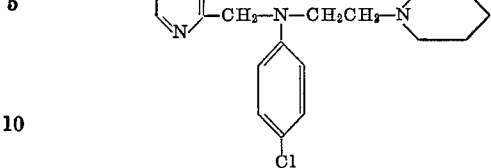
References Cited
UNITED STATES PATENTS
2,406,594  8/1946  Djerassi et al. _____ 260—276
HENRY R. JILES, Primary Examiner
G. THOMAS TODD, Assistant Examiner
U.S. Cl. X.R.
260—293.4, 294, 294.7, 294.8, 295, 296, 999

UNITED STATES PATENT OFFICE
Certificate

Patent No. 3,471,501                                                    Patented October 7, 1969

Seiji Miyano and Yoshitoshi Kase

Application having been made by Seiji Miyano and Yoshitoshi Kase, the inventors named in the patent above identified, and Takeda Chemical Industries, Ltd., Osaka, Japan, the assignee, for the issuance of a certificate under the provisions of Title 35, Section 256, of the United States Code, deleting the name of Yoshitoshi Kase as a joint inventor, and a showing and proof of facts satisfying the requirements of the said section having been submitted, it is this 12th day of May 1970, certified that the name of the said Yoshitoshi Kase is hereby deleted from the said patent as a joint inventor with the said Seiji Miyano.

[SEAL]

LUTRELLE F. PARKER
*Associate Solicitor.*